United States Patent
Onmus-Baykal et al.

(10) Patent No.: US 12,045,899 B2
(45) Date of Patent: Jul. 23, 2024

(54) INDEXING AND ADJUSTING FOR PROPERTY CONDITION IN AN AUTOMATED VALUATION MODEL

(75) Inventors: Elif Onmus-Baykal, Arlington, VA (US); Eric Rosenblatt, Derwood, MD (US); Dwayne D. Seegars, Columbia, MD (US); Herbert F. Frymark, Jr., Gaithersburg, MD (US); Benjamin Ross Hoffman, Washington, DC (US)

(73) Assignee: Fannie Mae, Washington, DC (US)

( * ) Notice: Subject to any disclaimer, the term of this patent is extended or adjusted under 35 U.S.C. 154(b) by 638 days.

(21) Appl. No.: 13/242,585

(22) Filed: Sep. 23, 2011

(65) Prior Publication Data
US 2013/0080340 A1    Mar. 28, 2013

(51) Int. Cl.
*G06Q 50/16*      (2024.01)
*G06Q 40/02*      (2023.01)

(52) U.S. Cl.
CPC ............ *G06Q 50/16* (2013.01); *G06Q 40/02* (2013.01)

(58) Field of Classification Search
CPC ........ G06Q 50/16; G06Q 30/06; G06Q 10/04; G06Q 30/02; G06Q 30/0283; G06Q 40/06; G06Q 30/0278; G06Q 40/02
See application file for complete search history.

(56) References Cited

U.S. PATENT DOCUMENTS 5,361,201 A * 11/1994 Jost et al. ............... 705/35
5,857,174 A * 1/1999 Dugan ..................... 705/313
5,966,700 A    10/1999 Gould et al.
6,609,109 B1 * 8/2003 Bradley et al. ............. 705/35
6,609,118 B1 * 8/2003 Khedkar et al. .......... 705/36 R (Continued)

OTHER PUBLICATIONS

Modeling Home Prices Using Realtor Data; Iain Pardoe ; Journal of Statistics Education vol. 16, No. 2 (2008), www.amstat.org/publications/jse/v16n2/datasets.pardoe.html; Copyright © 2008.*

(Continued)

*Primary Examiner* — Aryan E Weisenfeld
(74) *Attorney, Agent, or Firm* — Michael Best & Friedrich LLP

(57) ABSTRACT

Indexing and adjusting for property condition in an automated valuation model. Property data corresponding to a geographical area is accessed, and a regression is performed based upon the property data. The regression models the relationship between a dependent variable, such as price, and property-characteristic explanatory variables. Further regression is then performed and models or further explains the relationship between the dependent variable and property condition explanatory variables. Specifically, further regression may model the relationship between the residual from the first regression and the property condition variables. Optional examples of these variables are those based upon the presence of predetermined remarks in associated property listings, the number of photos in such listings, and a categorical year built variable. The regression is used to determine a property-condition index for the geographical area. The property-condition index identifies a predicted condition that is used to make adjustments to comparable properties in automated valuation modeling.

10 Claims, 7 Drawing Sheets

(56) References Cited

U.S. PATENT DOCUMENTS

| | | | |
|---|---|---|---|
| 6,804,609 B1 * | 10/2004 | Brumbaugh | 702/14 |
| 7,099,843 B1 | 8/2006 | Cassidy et al. | |
| 7,289,965 B1 | 10/2007 | Bradley et al. | |
| 7,340,431 B1 | 3/2008 | McManus et al. | |
| 7,451,095 B1 | 11/2008 | Bradley et al. | |
| 7,509,261 B1 | 3/2009 | McManus et al. | |
| 7,593,890 B1 | 9/2009 | Bradley et al. | |
| 7,647,272 B1 | 1/2010 | Muren | |
| 7,693,764 B1 | 4/2010 | Gordon et al. | |
| 7,711,574 B1 | 5/2010 | Bradley et al. | |
| 7,792,742 B1 | 9/2010 | Thomas et al. | |
| 7,797,166 B1 | 9/2010 | Bradley et al. | |
| 7,835,919 B1 | 11/2010 | Bradley et al. | |
| 7,882,025 B1 | 2/2011 | Seal et al. | |
| 7,904,381 B1 | 3/2011 | Tatang et al. | |
| 7,941,365 B1 | 5/2011 | Bradley et al. | |
| 7,941,366 B1 | 5/2011 | Bradley et al. | |
| 7,945,510 B1 | 5/2011 | Bradley et al. | |
| 7,970,674 B2 * | 6/2011 | Cheng et al. | 705/35 |
| 7,974,854 B1 | 7/2011 | Bradley et al. | |
| 7,987,137 B1 | 7/2011 | Thomas et al. | |
| 7,996,304 B1 | 8/2011 | Thomas et al. | |
| 7,996,313 B1 | 8/2011 | McMurray et al. | |
| 8,010,377 B1 | 8/2011 | Bradley et al. | |
| 8,046,306 B2 * | 10/2011 | Stinson | 705/313 |
| 8,108,302 B1 | 1/2012 | Bradley et al. | |
| 8,140,421 B1 | 3/2012 | Humphries et al. | |
| 8,209,258 B1 | 6/2012 | Seal et al. | |
| 8,239,318 B1 | 8/2012 | Bradley et al. | |
| 8,244,563 B2 | 8/2012 | Coon et al. | |
| 8,255,320 B1 | 8/2012 | Seal et al. | |
| 8,280,806 B1 | 10/2012 | Bradley et al. | |
| 8,326,749 B1 | 12/2012 | Seal et al. | |
| 8,386,395 B1 | 2/2013 | Gordon et al. | |
| 8,401,868 B1 | 3/2013 | Bradley et al. | |
| 8,401,961 B1 | 3/2013 | McMurray et al. | |
| 8,447,688 B1 | 5/2013 | Thomas et al. | |
| 8,521,644 B1 | 8/2013 | Hanson et al. | |
| 8,655,106 B2 * | 2/2014 | Den Herder et al. | 382/286 |
| 8,676,680 B2 * | 3/2014 | Humphries et al. | 705/35 |
| 2001/0039506 A1 * | 11/2001 | Robbins | 705/10 |
| 2005/0154656 A1 | 7/2005 | Kim et al. | |
| 2005/0154657 A1 | 7/2005 | Kim et al. | |
| 2006/0015357 A1 * | 1/2006 | Cagan | 705/1 |
| 2006/0089842 A1 * | 4/2006 | Medawar | 705/1 |
| 2008/0004893 A1 * | 1/2008 | Graboske | 705/1 |
| 2008/0301064 A1 * | 12/2008 | Burns | 705/400 |
| 2012/0005109 A1 * | 1/2012 | Stinson | G06Q 10/10 705/306 |
| 2012/0047082 A1 * | 2/2012 | Bodrozic | 705/314 |
| 2013/0080340 A1 * | 3/2013 | Onmus-Baykal et al. | 705/306 |
| 2013/0238512 A1 * | 9/2013 | Treadwell et al. | 705/306 |
| 2013/0304654 A1 * | 11/2013 | Ma et al. | 705/306 |
| 2014/0089047 A1 * | 3/2014 | Lazarre et al. | 705/7.31 |

OTHER PUBLICATIONS

Richard Cebula, "The Hedonic Pricing Model Applied to the Housing Market," Published 2009 (Year: 2009).*

Redfin 2006 (Year: 2006).*

Vandell, Kerry D. "Optimal Comparable Selection and Weighting in Real Property Valuation" AREUEA Journal, vol. 19, No. 2, 1991, pp. 213-239.

Gau, George W., et al. "Optimal Comparable Selection and Weighting in Real Property Valuation: An Extension" Journal of the American Real Estate and Urban Economics Association vol. 20, No. 1, 1992, pp. 107-123.

* cited by examiner

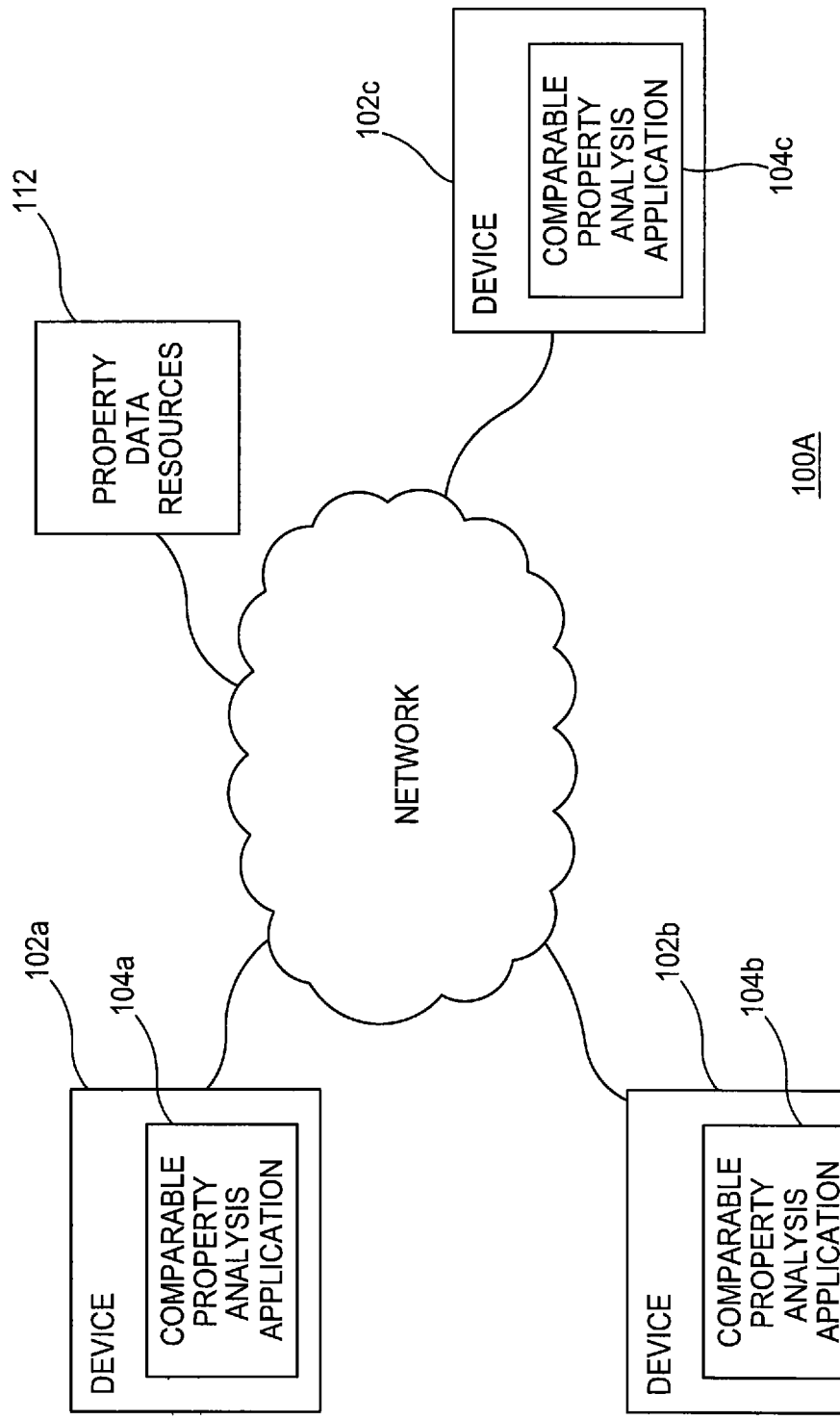

FIG. 5B

INDEXING AND ADJUSTING FOR PROPERTY CONDITION IN AN AUTOMATED VALUATION MODEL

CROSS REFERENCE TO RELATED APPLICATIONS

This application relates generally to computer modeling of real estate values and more particularly to an automated valuation model that indexes and adjusts for property condition.

BACKGROUND OF THE INVENTION

1. Field of the Invention

The present invention relates generally to displaying content and, more particularly, to displaying content through a storage device. 2. Description of the Related Art Automated valuation models (AVMs) are now widely used to automatically evaluate properties, such as for assessing the propriety of including comparable properties in an appraisal, determining whether an appraisal value is appropriate, and so forth.

These AVMs accurately evaluate properties based upon objective property characteristics such as the number of bedrooms and the lot size. Property condition is more subjective, and thus difficult to assess using an AVM.

What is needed is an AVM that implements accurate identification and adjustment for property condition in an automated fashion.

SUMMARY OF THE INVENTION

Example embodiments of the present invention automatically index and adjust for property condition in a valuation model.

For example, property data corresponding to a geographical area is accessed, and a regression is performed based upon the property data. The regression models the relationship between a dependent variable, such as price, and property-characteristic explanatory variables.

Further regression is performed and models or further explains the relationship between the dependent variable and property condition explanatory variables. Specifically, further regression may model the relationship between the residual from the first regression and the property condition variables. Optional examples of these variables are those based upon the presence of predetermined remarks in associated property listing, number of photos in the associated listings, and a categorical year built variable.

The regression is used to determine a property-condition index for the geographical area. The property-condition index identifies a predicted condition that is used to make adjustments to comparable properties in automated valuation modeling.

The present invention can be embodied in various forms, including computer implemented methods, computer program products, computer systems and networks, user interfaces, application programming interfaces, and the like.

BRIEF DESCRIPTION OF THE DRAWINGS

These and other more detailed and specific features of the present invention are more fully disclosed in the following specification, reference being had to the accompanying drawings, in which:

FIGS. 1A-B are block diagrams illustrating examples of systems in which a comparable property analysis application operates.

FIG. 5B is a display diagram illustrating an example of a map image and property grid data updated to indicate appraiser-chosen comparable properties among a listing of model-chosen comparable properties.

DETAILED DESCRIPTION OF THE INVENTION

Figure 1B:
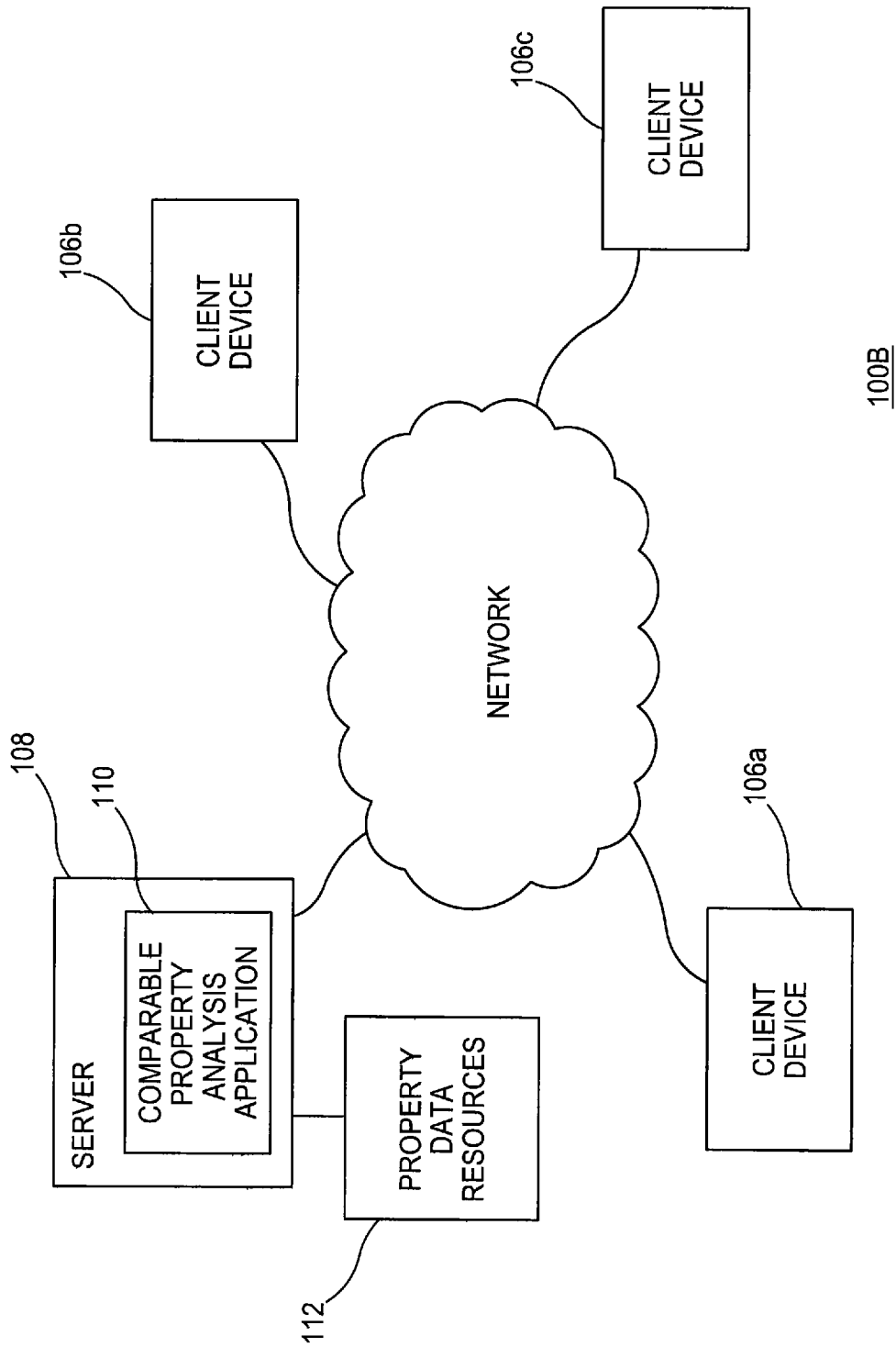

In the following description, for purposes of explanation, numerous details are set forth, such as flowcharts and system configurations, in order to provide an understanding of one or more embodiments of the present invention. However, it is and will be apparent to one skilled in the art that these specific details are not required in order to practice the present invention.

In one embodiment, the present invention automatically indexes and adjusts for property condition in a valuation model.

For example, property data corresponding to a geographical area is accessed, and a regression is performed based upon the property data. The regression models the relationship between a dependent variable, such as price, and property-characteristic explanatory variables. The initial regression may be referred to as a property-characteristic regression.

Further regression is then performed and models or further explains the relationship between the dependent variable and property condition explanatory variables. Specifically, further regression may model the relationship between the residual from the first regression and the property condition variables. Optional examples of these variables are those based upon the presence of predetermined remarks and number of photos in associated property listings, as well as a categorical year built variable.

The regression is used to determine a property-condition index for the geographical area. The property-condition index identifies a predicted condition that is used to make adjustments to properties in automated valuation of properties in the geographical area.

Exclusion rules may also be applied to refine a pool of comparable properties, before or after the adjustments for property-condition, so as to narrow the pool. Following this, the comparable properties may also be weighted, ranked, and displayed.

The valuation model may be run independently so as to assess any set of possible comparable properties for any given subject property. Alternatively, the valuation model may be run to assess an appraisal report by showing how well the comps in the appraisal report match the subject property relative to those predicted as good comparables by the model.

In connection with the display of the ranked listing, a map image may be displayed to illustrate the geographic distribution of the subject property and the comparable properties. Thus, in addition to offering the ranked listing that indicates where among the ranking the appraiser-chosen comparables are listed, there is a concurrent display on the map image that gives an immediate indication of the location of the comparable properties.

An associated property data grid further details information about the subject and comparable properties. The grid can be sorted according to a variety of property and other characteristics, and operates in conjunction with the map image to ease review of the comparables and corresponding criteria.

(i) Hedonic Equation (Initial Property Characteristics Regression)

The initial or base regression may be a hedonic regression that correlates a dependent variable to a number of property characteristic explanatory variables.

In an example hedonic equation, the dependent variable is sale price and the explanatory variables can include the physical characteristics, such as gross living area, lot size, age, number of bedrooms and or bathrooms, as well as location specific effects, time of sale specific effects, property condition effect (or a proxy thereof). The ordinarily skilled artisan will readily recognize that various different variables may be used in conjunction with the present invention.

In this example, the dependent variable is the logged sale price. The explanatory variables are:
(1) Four continuous property characteristics:
   (a) log of gross living area (GLA),
   (b) log of Lot Size,
   (c) log of Age, and
   (d) Number of Bathrooms; and
(2) Three fixed effect variables:
   (a) location fixed effect (e.g., by Census Block Group (CBG));
   (b) Time fixed effect (e.g., measured by 3-month periods (quarters) counting back from the estimation date); and
   (c) Foreclosure status fixed effect, which captures the maintenance condition and possible REO discount.

The exemplary equation (Eq. 1) is as follows:

$$\ln(p) = \beta_{gla} \cdot \ln(GLA) + \beta_{lot} \cdot \ln(LOT) + \\ \beta_{age} \cdot \ln(AGE) + \beta_{bath} \cdot BATH + + \sum_{i=1}^{N_{CBG}} LOC_i^{CBG} + \\ \sum_{j=1}^{N_{QTR}} TIME_j + \sum_{k=\{0,1\}} FCL_k + \varepsilon \quad \text{(Eq. 1)}$$

There may be various alternatives to the above example. Although CBG is used as the location fixed effect, other examples may include Census Tract or other units of geographical area. Additionally, months may be used in lieu of quarters, or other periods may be used regarding the time fixed effect. These and other variations may be used for the explanatory variables.

Additionally, although the county may be used for the relatively large geographic area for which the regression analysis is performed, other areas such as a multi-county area, state, metropolitan statistical area, or others may be used. Still further, some hedonic models may omit or add different explanatory variables. For example, additional explanatory variables may relate to whether properties border geographical features having special value connotations such as bodies of water, or are close to geographical features such as schools, hospitals, bodies of water, etc.

(ii) Property Condition Regression

The property characteristic regression is used to isolate other factors before the effects of property condition indicators are considered. The condition information derived from this is used to create a condition index of six categories from best to worst based on certain threshold values. The condition index score is then used to make adjustments for the comparable property sale value.

The following three explanatory variables are used in the property condition regression:
   Remarks Category (better condition, lower condition, no inference)
   Year Built Category (Pre1945, 1945-1978, Post1978)
   The number of photos.

It is understood that the year built category is obviously correlated with the age of the property, which is considered in the property characteristics regression as described above. However, here the variable is categorical and is bucketed in a fashion that provides useful information about the construction quality and the style of a house.

It has also been determined that the number of photos in listings correlates to better condition.

As to the remarks category, in one embodiment the following phrases have been determined as significantly correlated to a lower condition index: "need work", "rehab", "potential", "shell", "mold", "investor", "water damage", "handyman", "fire damage", "TLC", "sweat", "discolor" and "as is".

On the other hand, "renov", "remod", "restor", "hardwood", "move in", "well maintained", "new", "lush", "immaculate", "cathedral", "granite", "all brick", "master suite", "stainless", "stone", "slate", "crown", "upgrade", "update" and "fixt" are phrases that contributed significantly to a higher condition index.

As is evident from the above, root portions of words may be used to capture as many permutations as possible. For example "renov" may capture renovation, renovated, renovate, etc.

It should be noted that these are just examples of phrases with positive and negative connotations. The model can be adjusted to add or omit certain phrases with further study. Additionally, the contribution for certain phrases may later be determined to be of heightened significance. That is, some phrases may correlate to a much higher or lower condition, and the correlation may thus include numerous different condition levels.

Additionally, it should be noted that one or more of the above variables may be omitted. For example, there may be areas where number of photo data is insufficient. In those cases this variable may be omitted. Lastly, of course, additional variables pertinent to property condition may be implemented as well.

Dummy variables are defined to correlate to the phrases (e.g., 1=present, 0=absent), the other categories are defined (e.g., number of photos, year built category) and regression is then performed where e is the residual from the initial hedonic regression. This establishes a regression that identifies the contribution of the property condition characteristics. An example equation for the property condition regression in this embodiment is as follows:

$$\varepsilon = \sum_{k=\{0,1\}} \text{need\_work}_k + \sum_{k=\{0,1\}} \text{potential}_k + \sum_{k=\{0,1\}} \text{renov}_k + \quad \text{(Eq. 2)}$$
$$\ldots \sum_{k=\{0,1\}} \text{remod}_k + \sum_{k=\{pre-1945, 1945-1978, post-1978\}} \text{built\_cat}_k +$$
$$\beta_{number\_photo} \cdot \ln(\text{number\_photo})$$

A condition index is then created from the results of the property condition regression. Then, threshold values may be used to assign a discrete condition value to the property. In one embodiment, the assigned condition value may be six different categorical levels (C1-C6) in line with appraisers' standard evaluation of condition. The predicted condition can then be used to explain at least a portion of the residual in the first regression, as well as to perform exclusions to the comparable pool and adjustments in the comparable property value.

In one example, the categorization is as follows. After regression on the residuals on the dummy variables corresponding to the used phrases, the predicted values are obtained that are used to interpret the condition. Because each of these regressions may be county specific and run on a certain period of time, the distribution of the predicted values for that county and the time period are observed. The breakdown may be variously configured but assume that p1, p10, p30, p70, p99 are the 1st, 10th, 30th, 70th, 99th percentiles.

Then if the predicted value from the condition regression <=p1, Condition Category=C6;

if p1<the predicted value from the condition regression <=p10, Condition Category=C5;

if p10<the predicted value from the condition regression <=p30, Condition Category=C4;

if p30<the predicted value from the condition regression <=p70, Condition Category=C3;

if p70<the predicted value from the condition regression <=p99, Condition Category=C2; and if the predicted value from the condition regression >p99, Condition Category=C1

Note that these threshold percentages may vary, and may change in an existing implementation as desired.

The regression above is broken into separate instances of first and second regressions. In one example, MLS data is used to obtain the property condition data. Thus the source of property condition data may be less robust than the source of property characteristics data. Because of this, it will often be preferable to split the regression. However, with sufficient data the first and second elements of regression may be commonly performed.

(iii) Exclusion Rules

Comparable selection rules may also be used to narrow the pool of comps to exclude the properties which are determined to be insufficiently similar to the subject for reasons separate from the contributions as determined from the above-described regressions. The exclusion rules should be considered optional and will depend upon the implementation.

A comparable property should be located in a relative vicinity of the subject and should be sold relatively recently; it should also be of similar size and age and sit on a commensurate parcel of land. The "N" comparables that pass through the exclusion rules are used for further analysis and value prediction.

For example, the following rules may be used to exclude comparables pursuant to narrowing the pool:

(1) Property Condition: If the condition index differs from the comp condition by a threshold number then the comp is eliminated from the comp pool. In one embodiment, differing by 2 or more categories in the index results in elimination from the comp pool. In another embodiment, differing by 3 or more categories in the index results in elimination from the comp pool.

(2) Neighborhood: comps must be located in the Census Tract of the subject and its immediate neighboring tracts;

(3) Time: comps must be sales within twelve months of the effective date of appraisal or sale;

(4) GLA must be within a defined range, for example:

$$\frac{2}{3} \leq \frac{GLA_S}{GLA_C} \leq \frac{3}{2}$$

(5) Age similarity may be determined according to the following Table 1:

TABLE 1

| Subject Age | 0-2 | 3-5 | 6-10 | 11-20 | 21-40 | 41-65 | 65+ |
|---|---|---|---|---|---|---|---|
| Acceptable Comp Age | 0-5 | 0-10 | 2-20 | 5-40 | 11-65 | 15-80 | 45+ |

(6) Lot size similarity may be determined according to the following Table 2:

TABLE 2

| Subject Lot size | <2000 sqft | 2000-4000 sqft | 4000 sqft-3 acres | >3 acres |
|---|---|---|---|---|
| Acceptable Comp Lot | 1-4000 sqft | 1-8000 sqft | $\frac{2}{5} \leq \frac{LOT_S}{LOT_C} \leq \frac{5}{2}$ | >1 acre |

These exclusion rules are provided by way of example. There may be a set of exclusion rules that add variables, that omit one or more the described variables, or that use different thresholds or ranges.

(iii) Adjustment of Comps

Given the pool of comps to be analyzed by the model, the sale price of each comp may then be adjusted to reflect the difference between a given comp and the subject in each of the characteristics used in the regressions.

For example, individual adjustments are given by the following set of equations (2):

$$A_{gla} = \exp[(\ln(GLA_S) - \ln(GLA_C)) \cdot \beta_{gla}];$$

$$A_{lot} = \exp[(\ln(LOT_S) - \ln(LOT_C)) \cdot \beta_{lot}];$$

$$A_{age} = \exp[(\ln(AGE_S) - \ln(AGE_C)) \cdot \beta_{age}];$$

$$A_{bath} = \exp[(BATH_S - BATH_C) \cdot \beta_{age}];$$

$$A_{loc} = \exp[LOC_S - LOC_C];$$

$$A_{time} = \exp[TIME_S - TIME_C]; \text{ and}$$

$$A_{fcl} = \exp[FCL_S - FCL_C], \quad \text{(Eq. 3)}$$

where coefficients βgla, βlot, βage, (bath, LOC, TIME, FCL are obtained from the hedonic price equation described above.

(iv) Weighting of Comps and Value Prediction

Because of unknown neighborhood boundaries and potentially missing data, the pool of comparables will likely include more than are necessary for the best value prediction in most markets. The adjustments described above can be quite large given the differences between the subject property and comparable properties. Accordingly, rank ordering and weighting are also useful for the purpose of value prediction.

The economic distance $D_{eco}$ between the subject property and a given comp may be described as a function of the differences between them as measured in dollar value for a variety of characteristics, according to the adjustment factors described above.

Specifically, the economic distance may be defined as a Euclidean norm of individual percent adjustments for all characteristics used in the hedonic equation:

$$D_{SC}^{eco} = \sqrt{\sum_{i \in \{gla, lot, age, bath, loc, time, fcl\}} (A_i - 1)^2} \qquad (Eq.\ 4)$$

The comps are then weighted. Properties more similar to the subject in terms of physical characteristics, location, and time of sale are presumed better comparables and thus are preferably accorded more weight in the prediction of the subject property value. Accordingly, the weight of a comp may be defined as a function inversely proportional to the economic distance, geographic distance and the age of sale.

For example, comp weight may be defined as:

$$w_C = \frac{1}{D_{SC}^{eco} \cdot D_{SC}^{geo} \cdot dT_{SC}} \qquad (Eq.\ 5)$$

where $D_{geo}$ is a measure of a geographic distance between the comp and the subject, defined as a piece-wise function:

$$D_{SC}^{geo} = \begin{cases} 0.1 & \text{if} \quad d_{SC} < 0.1 \text{ mi} \\ d_{SC} & \text{if} \quad 0.1 \text{ mi} \leq d_{SC} \leq 1.0 \text{ mi}, \\ 1.0 + \sqrt{d_{SC} - 1.0} & \text{if} \quad d_{SC} > 1.0 \text{ mi} \end{cases} \qquad (Eq.\ 6)$$

and dT is a down-weighting age of comp sale factor $$dT_{SC} = \begin{cases} 1.00 & \text{if} \quad (0, 90] \text{days} \\ 1.25 & \text{if} \quad (90, 180] \text{days} \\ 2.00 & \text{if} \quad (180, 270] \text{days} \\ 2.50 & \text{if} \quad (270, 365] \text{days}. \end{cases} \qquad (Eq.\ 7)$$

Comps with higher weight receive higher rank and consequently contribute more value to the final prediction, since the predicted value of the subject property based on comparable sales model is given by the weighted average of the adjusted price of all comps:

$$\hat{p}_S = \frac{\sum_{C=1}^{N_{COMPS}} w_C \cdot p_C^{adj}}{\sum_{C=1}^{N_{COMPS}} w_C} \qquad (Eq.\ 8)$$

As can be seen from the above, the separate weighting following the determination of the adjustment factors allows added flexibility in prescribing what constitutes a good comparable property. Thus, for example, policy factors such as those for age of sale data or location may be separately instituted in the weighting process. Although one example is illustrated it should be understood that the artisan will be free to design the weighting and other factors as necessary.

(v) Property Condition Adjustments

The previously described adjustments are made for the various property characteristics. An adjustment is also made based upon the property condition index. Preferably, after obtaining an estimated sale price from comp sales model, the difference between the actual and predicted price is regressed on the predicted condition index to obtain a price for each of the condition categories. Then based on these coefficients, and the difference between the subject and comp condition, an adjustment is made to the predicted sale price of the subject.

As an alternative it is possible to regress log price on property characteristics and predicted condition indices in the hedonic regression. However, this may not be viewed as desirable because the residuals from the hedonic regression were used to predict the condition. In any event, this approach may be more defendable when are operating out of sample.

It should also be noted that an appraisal may be reviewed to determine the propriety of a property condition adjustment. There, the system may review the comparables that appraisers selected, and compare those with the model selected comparables pool. If, in some appraisals, an appraiser has made a big adjustment based on condition or picked rather expensive comps to justify the subject's price, the predicted condition index can be used to determine whether the selected comparable(s) were appropriate.

(vi) Listing and Mapping of Comparable Properties

The comparable properties may then be listed according to the weighting, or a ranking from the highest weighted comparable property to the lowest. This listing may be variously limited to accommodate listing them within a display area. For example, a default setting might be 20 comparable properties. The list of comparable properties includes, of course, the model-chosen comparable properties. They may also include appraiser-chosen comparables.

According to another aspect, mapping and analytical tools that implement the comparable model are provided. Mapping features allow the subject property and comparable properties to be concurrently displayed. Additionally, a table or grid of data for the subject properties is concurrently displayable so that the list of comparables can be manipulated, with the indicators on the map image updating accordingly.

For example, mapping features include the capability to display the boundaries of census units, school attendance zones, neighborhoods, as well as statistical information such as median home values, average home age, etc.

The grid/table view allows the user to sort the list of comparables on rank, value, size, age, or any other dimension. Additionally, the rows in the table are connected to the full database entry as well as sale history for the respective property. Combined with the map view and the neighborhood statistics, this allows for a convenient yet comprehensive interactive analysis of comparable sales.

With further reference to the figures, examples of environments and particular embodiments implementing an AVM that automatically adjusts for property condition.

FIGS. 1A-B are block diagrams illustrating examples of systems 100A-B in which a comparable property analysis application operates.

FIG. 1A illustrates several user devices 102a-c each having a comparable property analysis application 104a-c.

The user devices 102a-d are preferably computer devices, which may be referred to as workstations, although they may be any conventional computing device. The network over which the devices 102a-d may communicate may also implement any conventional technology, including but not limited to cellular, WiFi, WLAN, LAN, or combinations thereof.

In one embodiment, the comparable property analysis application 104a-c is an application that is installed on the user device 102a-c. For example, the user device 102a-c may be configured with a web browser application, with the application configured to run in the context of the functionality of the browser application. This configuration may also implement a network architecture wherein the comparable property analysis applications 104a-c provide, share and rely upon the comparable property analysis application 104a-c functionality.

As an alternative, as illustrated in FIG. 1B, the computing devices 106a-c may respectively access a server 108, such as through conventional web browsing, with the server 108 providing the comparable property analysis application 110 for access by the client computing devices 106a-c. As another alternative, the functionality may be divided between the computing devices and server. Finally, of course, a single computing device may be independent configured to include the comparable property analysis application.

As illustrated in FIGS. 1A-B, property data resources 112 are typically accessed externally for use by the comparable property analysis application, since the amount of property data is voluminous, and since the application is configured to allow access to any county or local area in a very large geographical area (e.g., for an entire country such as the United States). Additionally, the property data resources 112 are shown as a singular block in the figures, but it should be understood that a variety of resources, including company-internal collected information (e.g., as collected by Fannie Mae), as well as external resources, whether resources where property data is typically found (e.g., MLS, tax, etc.), or resources compiled by an information services provider (e.g., Lexis).

The comparable property analysis application accesses and retrieves the property data from these resources in support of the modeling of comparable properties as well as the rendering of map images of subject properties and corresponding comparable properties, and the display of supportive data (e.g., in grid form) in association with the map images.

Figure 2:
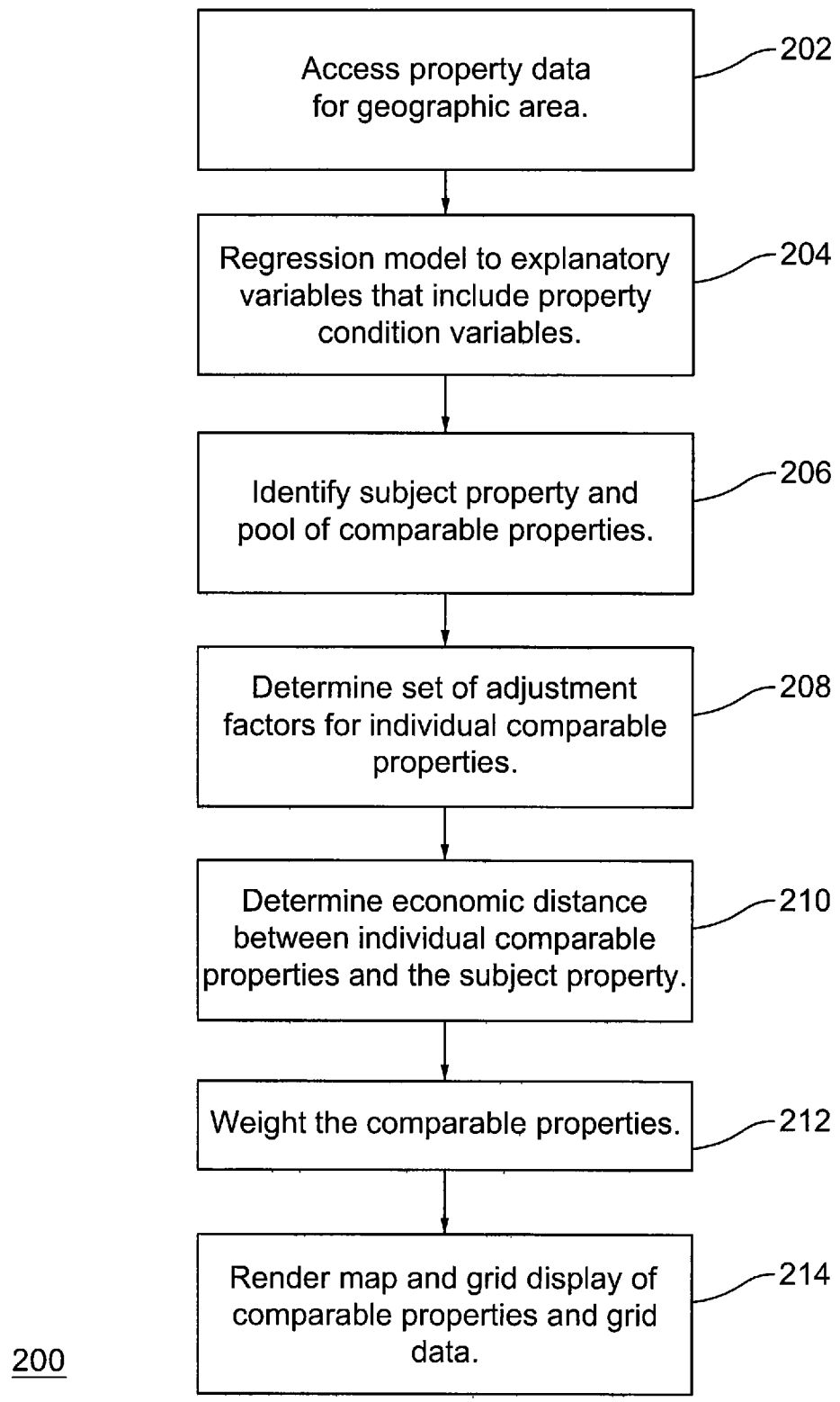
FIG. 2 is a flow diagram illustrating an example of a process for modeling comparable properties with property condition adjustment.

FIG. 2 is a flow diagram illustrating an example of a process 200 for modeling comparable properties, with adjustment for property condition, which is performed by the comparable property analysis application.

As has been described, the application accesses 202 property data. This is preferably tailored at a geographical area of interest in which a subject property is located (e.g., county). A regression 204 modeling the relationship between price and explanatory variables is then performed on the accessed data. Although various alternatives may be applied, a preferred regression sequence is that described above, wherein a property characteristics regression is performed, and then residuals from that regression and property condition variables are used to create a property condition index that is used to adjust for property condition.

A subject property within the county is identified 206 as is a pool of comparable properties. As described, the subject property may be initially identified, which dictates the selection and access to the appropriate county level data. Alternatively, a user may be reviewing several subject properties within a county, in which case the county data will have been accessed, and new selections of subject properties prompt new determinations of the pool of comparable properties for each particular subject property.

The pool of comparable properties may be initially defined using exclusion rules. This limits the unwieldy number of comparables that would likely be present if the entire county level data were included in the modeling of the comparables.

A set of adjustment factors is determined 208 for each comparable property in the pool. The adjustment factors may be a numerical representation of the price contribution of each of the explanatory variables, as determined from the difference between the subject property and the comparable property for a given explanatory variable. An example of the equations for determining these individual adjustments has been provided above.

Once these adjustment factors have been determined 208, the "economic distance" between the subject property and respective individual comparable properties may also be determined 210. The economic distance is preferably constituted as a quantified value representative of the estimated price difference between the two properties as determined from the set of adjustment factors for each of the explanatory variables, including property condition.

Following determining of the economic distance, the comparable properties are weighted 212 in support of generating a ranking of the comparable properties according to the model. A preferred weighting, described previously, entails a function inversely proportional to the economic distance, geographic distance and age of transaction (typically sale) of the comparable property from the subject property.

The weights may further be used to calculate an estimated price of the subject property comprising a weighted average of the adjusted price of all of the comparable properties.

Once the model has performed the regression, adjustments and weighting of comparables, a display is rendered 214 to convey the comparable analysis results, preferably in the form of grid and map image displays to allow convenient and comprehensive review and analysis of the set of comparables.

Figure 3:
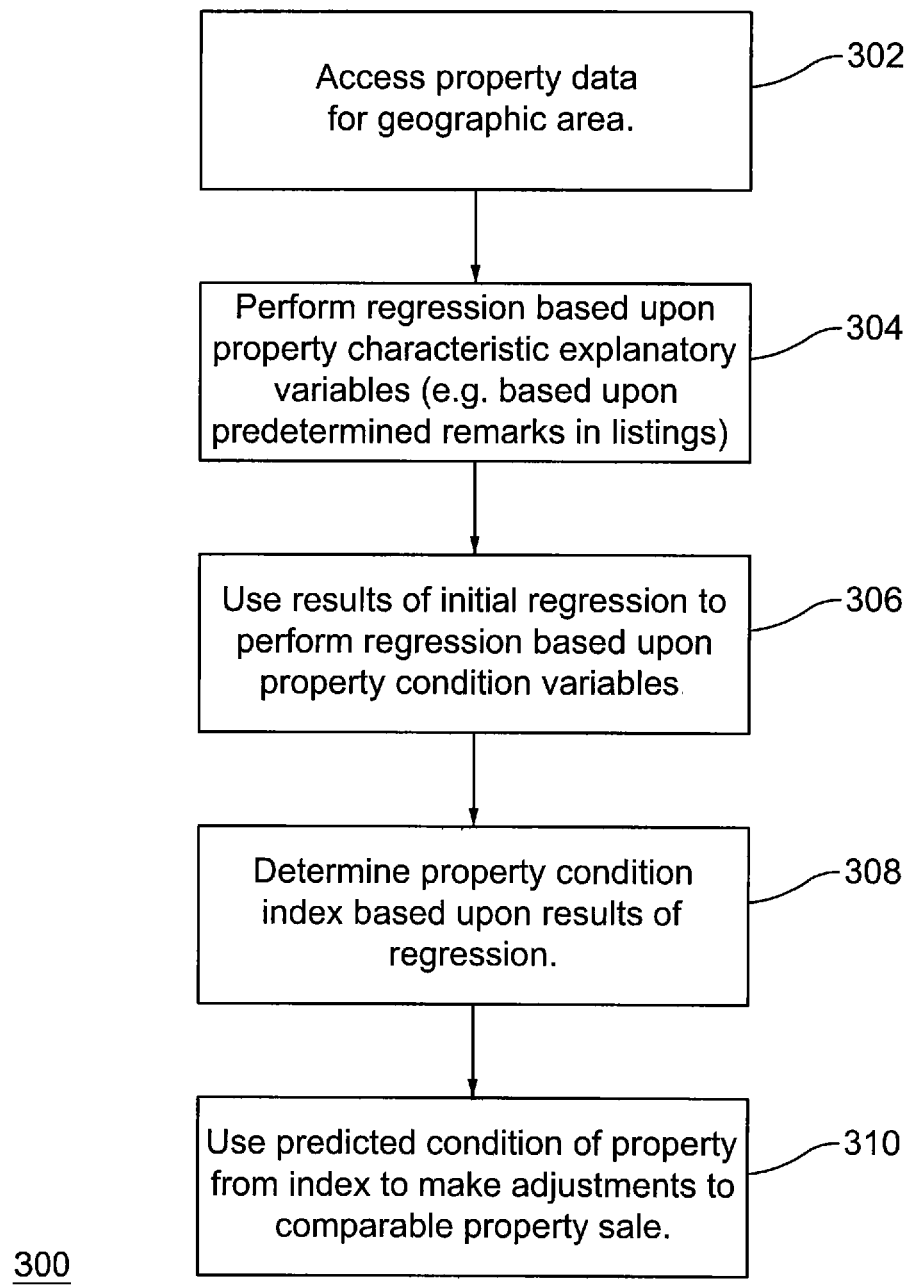
FIG. 3 is a flow diagram illustrating an example of a method for indexing and adjusting property condition using real estate condition remarks.

FIG. 3 is a flow diagram illustrating an example of a process 300 for indexing and adjusting property condition using property condition variables and in particular real estate condition remarks.

Property data for a geographical area of interest is accessed 302 and regression 304 is performed based upon the property data. As detailed further above, the regression models the relationship of a dependent variable such as price to various property-characteristic variables.

Further regression is then performed 306 based upon the results of the initial regression. This further regression models or further explains the relationship between the dependent variable and property condition explanatory variables. Specifically, further regression may model the relationship between the residual from the first regression and the property condition variables. This portion of the regression models the relationship of the dependent variable to property-condition variables. The property-condition variables preferably include a categorical variable that depends upon the presence or absence of both value enhancing and value reducing remarks in associated property listings. Additional property-condition variables include a categorical year-built variable, and one based upon the number of photos in the associated property listings.

The regression modeling the relationship to the property-characteristic variables is then used to determine 308 a property condition index pertinent to the geographic area. The index provides a predicted condition for a given property that is used 310 to make value adjustments to the property sale.

Once these adjustments are made, the properties can be weighted, ranked, and displayed accordingly.

Figure 4:
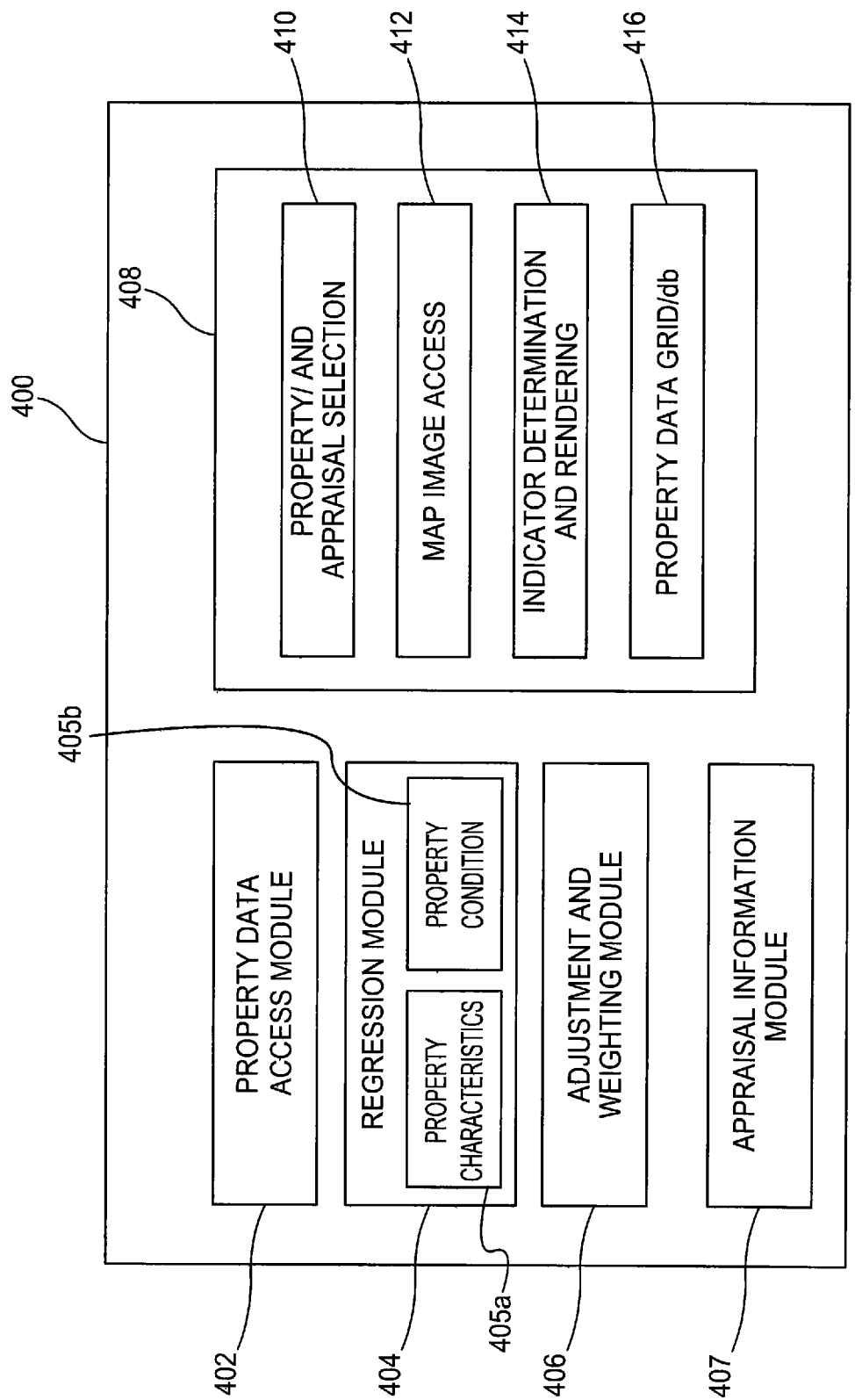
FIG. 4 is a block diagram illustrating an example of a comparable property analysis application incorporating regression involving property condition variables and corresponding indexing and adjustment.

FIG. 4 is a block diagram illustrating an example of a comparable property analysis application 400 incorporating regression involving property condition variables and corresponding indexing and adjustment. The application 400 preferably comprises program code that is stored on a computer readable medium (e.g., compact disk, hard disk, etc.) and that is executable by a processor to perform operations to automatically model comparable properties, with property condition indexing and adjusting.

According to one aspect, the application 400 includes program code executable to perform operations of accessing property data corresponding to a geographical area, performing the regression, identifying comparable properties, performing value adjustments, and weighting the comparable properties as described above.

The application 400 includes program code executable to perform operations of accessing property data corresponding to a geographical area, and performing a first regression based upon the property data, the first regression modeling the relationship between a dependent variable and property-characteristic explanatory variables. A further regression implements the results of the first regression and models the relationship between the dependent variable and one or more property-condition explanatory variables, and the property condition index is determined for the geographical area based upon results of the second regression.

The application 400 also includes program code for displaying a map image corresponding to the geographical area, and displaying indicators on the map image indicative of the subject property and at least one of the plurality of comparable properties, as well as ranking the plurality of comparable properties based upon the weighting, and displaying a text listing of the plurality of comparable properties according to the ranking.

The comparable property analysis application 400 is preferably provided as software, but may alternatively be provided as hardware or firmware, or any combination of software, hardware and/or firmware. The application 400 is configured to provide the comparable property modeling, appraisal results comparing and corresponding mapping functionality described herein. Although one modular breakdown of the application 400 is offered, it should be understood that the same functionality may be provided using fewer, greater or differently named modules.

The example of the comparable property analysis application 400 of FIG. 4 includes a property data access module 402, regression module 404, adjustment and weighting module 406, appraisal information module 407, and UI module 408, with the UI module 408 further including a property and appraisal selection module 410, map image access module 412, indicator determining and rendering module 414 and property data grid/DB module 416.

The property data access module 402 includes program code for carrying access and management of the property data, whether from internal or external resources. The regression module 404 includes program code for carrying out the regression upon the accessed property data, according to the regression algorithm described above, and produces corresponding results such as the determination of regression coefficients and other data at the country (or other) level as appropriate for a subject property. In particular, the regression module 404 implements both a property characteristics 405a and property condition 405b regression, with the former correlating a dependent variable such as price to various property characteristics, and the latter correlating the dependent variable to property condition variables. A preferred set of regression variables is set forth in detail above. The regression module 404 implements program code executable for carrying out the regression given the described explanatory variables and property data.

The adjustment and weighting module 406 is configured to apply the exclusion rules, and to calculate the set of adjustment factors for the individual comparables, the economic distance, and the weighting of the comparables.

The appraisal information module 407 may be a stand-alone database or may organize access to a variety of external databases of appraisal information. The appraisal information is typically in the form of appraisal reports for subject properties, wherein a set of comparable properties chosen by an appraiser is listed. The appraisal information may be retrieved based upon a variety of criteria, including search by subject property, identification number, or characteristics (appraiser ID, vendor, date, etc.).

The UI module 408 manages the display and receipt of information to provide the described functionality. It includes a property and appraisal selection module 410, to manage the interfaces and input used to identify one or more subject properties and corresponding appraisal information. The map image access module 412 accesses mapping functions and manages the depiction of the map images as well as the indicators of the subject property and the comparable properties. The indicator determination and rendering module 414 is configured to manage which indicators should be indicated on the map image depending upon the current map image, the weighted ranking of the comparables and predetermined settings or user input. The property data grid/DB 416 manages the data set corresponding to a current session, including the subject property and pool of comparable properties. It is configured as a database that allows the property data for the properties to be displayed in a tabular or grid format, with various sorting according to the property characteristics, economic distance, geographical distance, time, etc.

Figure 5A:
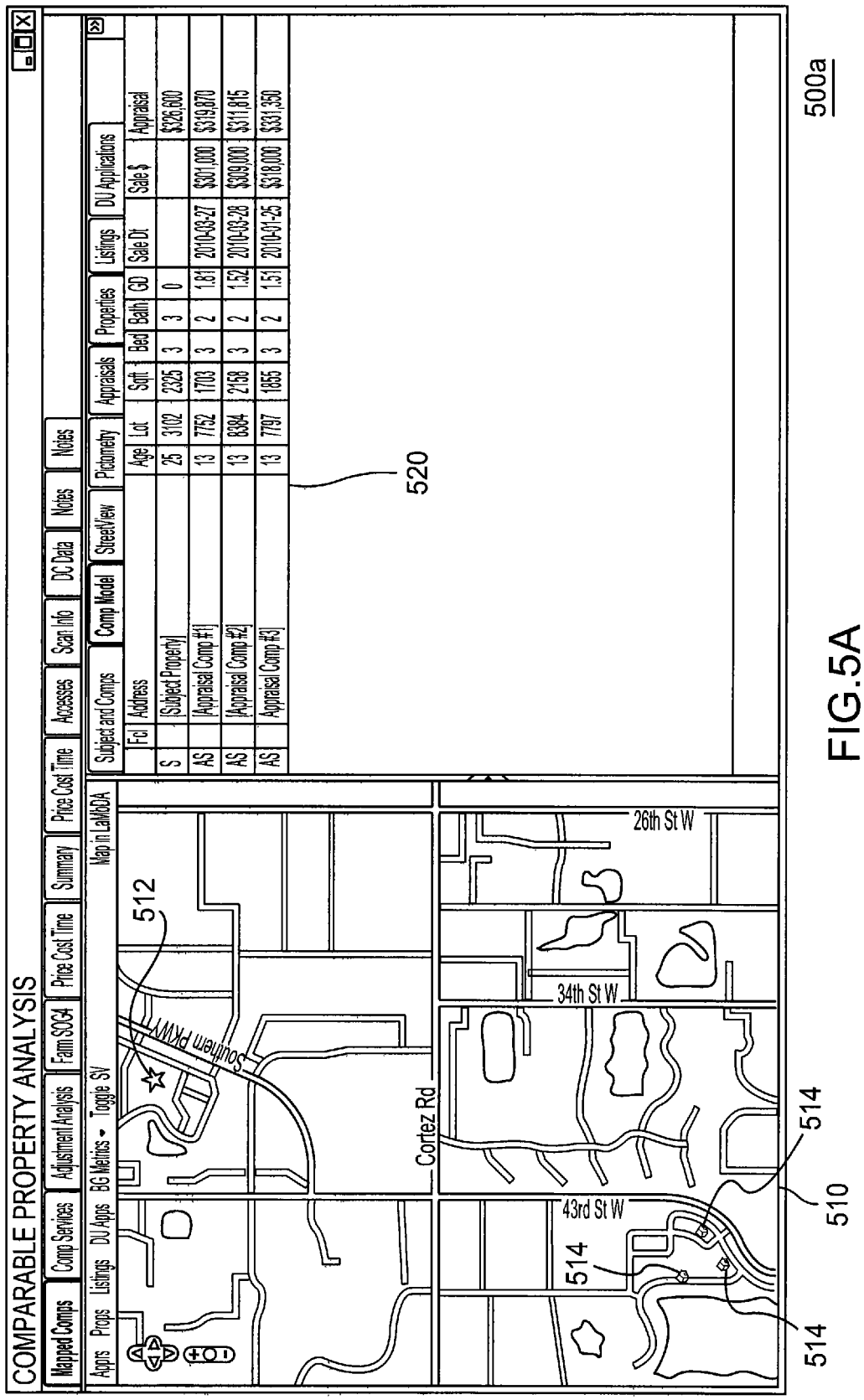
FIG. 5A is a display diagram illustrating an example of a map image and corresponding property grid data for a list of appraiser-chosen comparable properties.
Figure 5B:
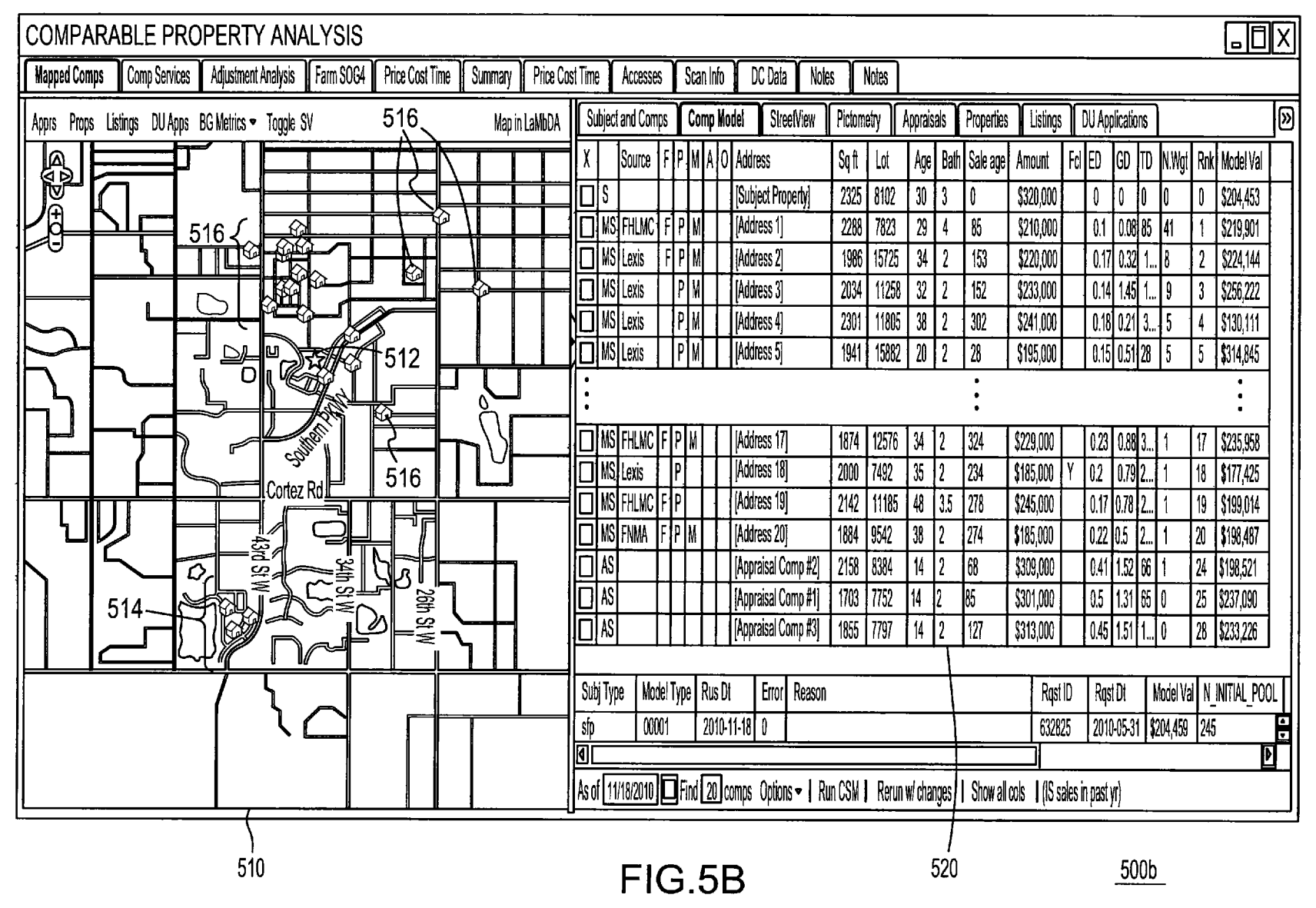

FIG. 5A is a display diagram illustrating an example of a map image 510a and corresponding property grid data 520a for a list of appraiser-chosen comparable properties, and FIG. 5B is a display diagram illustrating an example of a map image 510a and property grid data 520b updated to indicate appraiser-chosen comparable properties among a ranked listing of model-chosen comparable properties.

The map image 510a-b depicts a region that can be manipulated to show a larger or smaller area, or moved to shift the center of the map image, in convention fashion. This allows the user to review the location of the subject property 512 and corresponding comps 514, 516 at any desired level of granularity. This map image 510a-b may be separately viewed on a full screen, or may be illustrated alongside the property data grid 520a-b as shown.

The property grid data 520a-b contains a listing of details about the subject property and the comparable properties, as well as various information fields. The fields include an identifier field (e.g., "S" indicates the subject property, "AS" indicates an appraiser-chosen comparable property, and "MS" indicates a model-chosen comparable property), the source of data for the property ("Source"), the address of the property ("Address"), the square footage ("Sq Ft"), the lot size ("Lot"), the age of the property ("Age"), the number of bathrooms ("Bath"), the age of the prior sale ("Sale Age"), the prior sale amount ("Amount"), the foreclosure status ("FCL", y/n), the economic distance ("ED"), geographic distance ("GD") and time distance ("TD", e.g., as measured in days) factors as described above, the weight ("N. Wgt"), the ranking by weight ("Rnk"), and the valuation as determined from the comparable sales model ("Model Val").

Initially, a user may navigate through an appraisal selection screen that allows the user to identify and select an appraisal report for a subject property. Once this report is selected, the map image 510a-b and property grid data 520a-b may be prompted accordingly, such that the subject property and the appraiser-chosen comparable properties are listed and displayed.

For example, FIG. 5A illustrates an example of a display screen 500a that concurrently displays a map image 510a and a corresponding property data grid 520a once an appraisal report for a subject property has been selected. As indicated in the property grid data, the listing identified as "S" is the subject property, and the listings identified as "AS" indicate appraiser-chosen comparable properties. The subject property 512 and appraiser-chosen comparable properties 514 are indicated in the map image as well.

The updated display screen 500b of FIG. 5B may be displayed following execution of the comparable property model, which identifies the comparable properties, determines adjustment factors, determines economic distance and weights the comparable properties, such as described above. At this point, the map image 510b is updated to include not only the subject property 512 and appraiser-chosen comparable properties 514, but also the model-chosen properties 516 that were not in the appraisal report. Similarly, the property data grid 520b updates to include the model-chosen properties that were not in the appraisal report ("MS"). As illustrated, here, the model ranked the appraiser-chosen comparables as 24$^{th}$, 25$^{th}$ and 26$^{th}$ among the properties it determined to be appropriate comparables. The listing also indicates the top 20 model-chosen comparable properties. Additionally, the map image 510b indicates that the appraiser-chosen comparable properties 514 are further geographically from the subject property than are many of the model-chosen properties 516.

Further assessment of the data can be variously undertaken by the user. The map image 510 also allows the user to place a cursor over any of the illustrated properties to prompt highlighting of information for that property and other information. Additionally, the listing of comparables in the property grid data 520 can be updated according to any of the listed columns. The grid data can be variously sorted to allow the user to review how the subject property compares to the listed comparable properties.

Still further, the map image 510 can be divided into regions to help further assess the location of the subject property and corresponding properties. For example, the map image can be updated to indicate several Census Block Group (CBG) regions in the map image, along with trend or other data particular to each CBG. This helps the user to further assess how the subject property relates to the comparable properties, with the CBG acting as a proxy for neighborhood. By way of example, the map image 510 of FIG. 5B illustrates several CBG separated by darker lines. As can be seen many of the most higher ranked model-chosen properties 516 reside in the same CBG as the subject property, whereas the appraiser-chosen comparable properties 514 reside in a different, distant CBG. Still further, the map image 510 indicates proximity of the appraiser-chosen comparable properties 514 to an important value-affecting feature (a lake) whereas the subject property and the closest model-chosen comparable properties are resident relatively distant from the important feature. This visual comparison concurrent with the presentation of the raw data in the grid allows a powerful and efficient assessment of the comparable properties.

The user may variously update the map image and manipulate the property data grid in order to review and assess and subject property and the corresponding comparable properties in a fashion that is both flexible and comprehensive.

Thus embodiments of the present invention produce and provide indexing and adjusting for property condition in an automated valuation model. Although the present invention has been described in considerable detail with reference to certain embodiments thereof, the invention may be variously embodied without departing from the spirit or scope of the invention. Therefore, the following claims should not be limited to the description of the embodiments contained herein in any way.

The invention claimed is:

1. A non-transitory data storage device having computer code embodied thereon, the computer code when executed by a processor causes the processor to perform operations comprising:
   generating, on a display screen when a user navigates through a selection screen and selects subject information, a map image of a geographical area;
   generating, on the display screen alongside the map image, alphanumeric characters that list information about properties in the geographical area;
   generating, at a location on the map image, an icon that represents where one of the properties is sited in the geographical area; and
   highlighting, on the display screen when the user places a cursor over the icon, the information for said one of the properties;
   generating, by performing a property-characteristics regression on the information using a first plurality of explanatory variables, a regression result;
   performing, on the regression result, a property-condition regression that differs from the property-characteristics regression, to model the relationship between any dependent variables used in the property-characteristics regression and the first plurality of explanatory variables,
   wherein the property-characteristics regression is a first multivariable regression using the first plurality of explanatory variables, and the property-condition regression is a second multivariable regression using a second plurality of explanatory variables distinct from the first plurality of explanatory variables; and using the property-characteristic regression and the property-condition regression to determine a property-condition index for the geographical area.

2. The non-transitory data storage device according to claim 1, wherein the map is viewable on a full screen.

3. The non-transitory data storage device according to claim 1, wherein the computer code when executed by a processor performs operations further comprises:

sorting, on the display screen according to a characteristic of the properties, the information in the alphanumeric characters.

4. The non-transitory data storage device according to claim 1, wherein the alphanumeric characters lists the information identified by an appraiser.

5. The non-transitory data storage device according to claim 4, wherein the subject information is an appraisal report for a subject property.

6. The non-transitory data storage device according to claim 1, wherein the computer code when executed by a processor performs operations further comprises:

receiving, from a distributed network configured to facilitate electronic communication between electronic devices, the information.

7. The non-transitory data storage device according to claim 1, wherein the property-characteristic regression is a hedonic regression.

8. The non-transitory data storage device according to claim 1, wherein the alphanumeric characters lists the information that was identified by the regression result.

9. The non-transitory data storage device according to claim 1, wherein the first plurality of explanatory variables includes two or more of gross living area, age, number of bathrooms and location.

10. The non-transitory data storage device according to claim 9, wherein the second plurality of explanatory variables includes two or more of condition remarks, year built and number of photos.

* * * * *